Sept. 24, 1929.   J. P. WHANN   1,729,197
ARMORED WELL SCREEN AND METHOD OF MAKING THE SAME
Filed Sept. 28, 1927   2 Sheets-Sheet 1
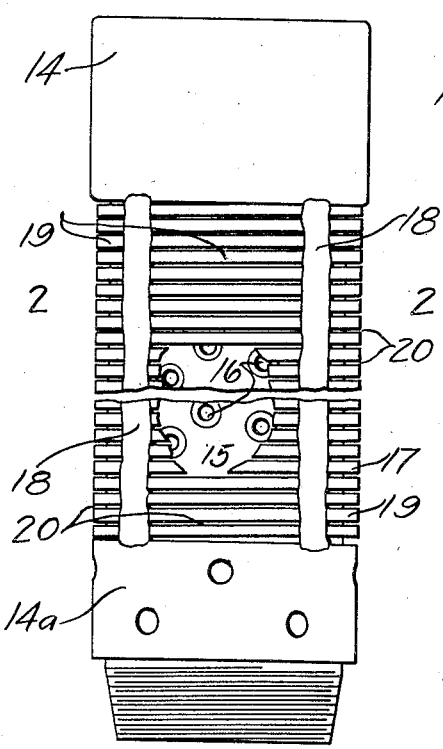
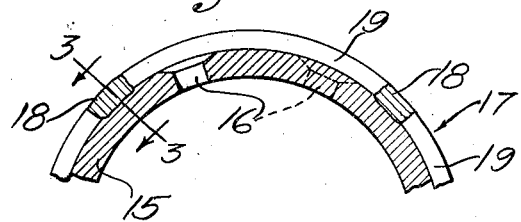
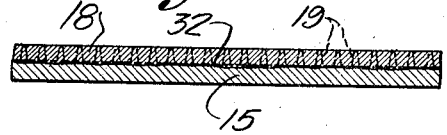
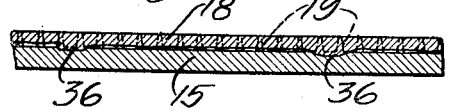
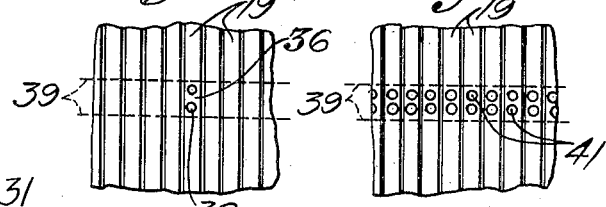
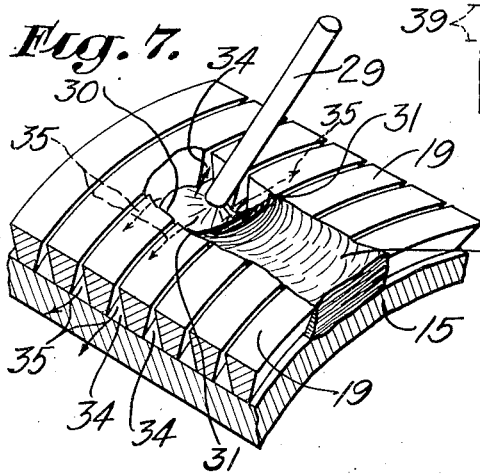
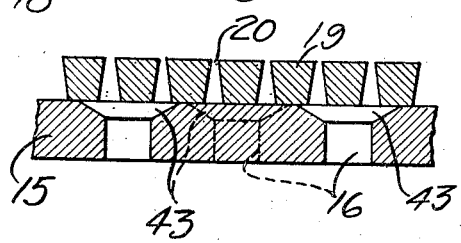
INVENTOR:
Jesse P. Whann Sept. 24, 1929. J. P. WHANN 1,729,197
ARMORED WELL SCREEN AND METHOD OF MAKING THE SAME
Filed Sept. 28, 1927 2 Sheets-Sheet 2
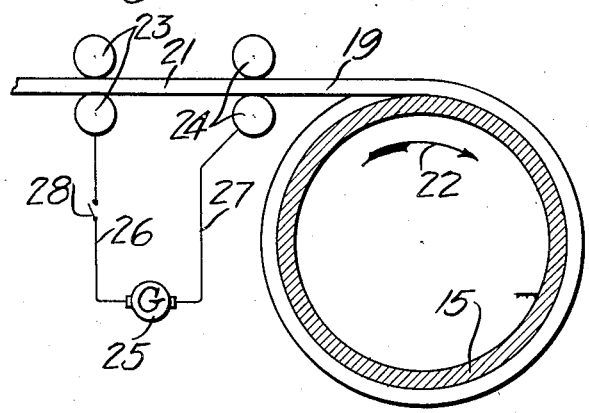
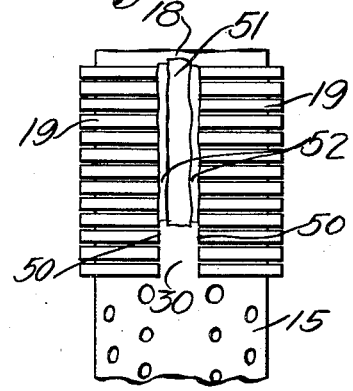
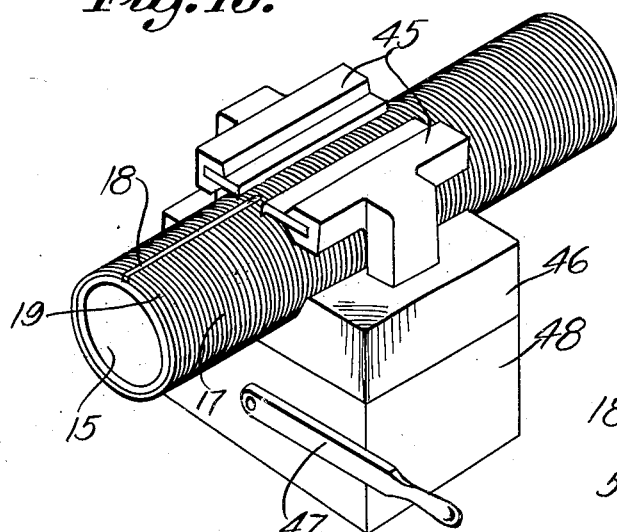
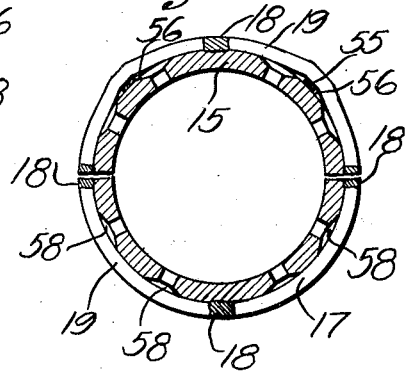
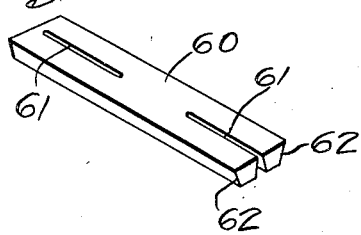
INVENTOR:
Jesse P. Whann

UNITED STATES PATENT OFFICE

JESSE P. WHANN, OF LOS ANGELES, CALIFORNIA, ASSIGNOR TO LAYNE & BOWLER CORPORATION, OF LOS ANGELES, CALIFORNIA, A CORPORATION OF CALIFORNIA.

ARMORED WELL SCREEN AND METHOD OF MAKING THE SAME

Application filed September 28, 1927. Serial No. 222,550.

This invention relates to well screen or strainer of the character employed in oil and water wells for the purpose of holding back the earth formation, but being provided with suitable openings through which fluids contained in the earth structure may enter the opening constituting the well, and has its principal utility in deep or high pressure oil and gas wells in which several conditions are encountered.

It is a principal object of the invention to provide a well screen of the above character having large separating capacity and ample strength and durability for the use for which it is intended.

It is an object of the invention to provide a well screen consisting of a tubular supporting structure, such as a perforated pipe, having a perforated casing thereover such casing consisting of longitudinal ribs having narrow bars extended therebetween, these bars being spaced apart to form slots through which the fluids may enter the screen structure, and the spacing of the narrow bars serving as means for determining the gauge or width of the screen slots.

It is an object of the invention to provide a novel method for making a screen of the character above set forth, and is a principal feature of this method to apply the mesh forming bars to the outer surface of the supporting structure in their properly spaced arrangement and then to cause tie-bars or ribs to traverse the mesh-forming bars by first cutting a channel across these bars and then filling this channel with a continuous strip of metal. This strip of metal constituting the tie-bars or ribs is preferably formed by fusing metal of a similar character to that of the bars into the channels by the use of electric welding, this fused metal preferably filling the channels and being fused to the bars so as to make the mesh-forming bars and the reinforcing ribs into a homogeneous or integral structure constituting a casing on the supporting structure.

It is a further object of the invention to fuse the longitudinal reinforcing ribs or strips, which traverse the mesh-forming bars, to the supporting structure either continuously throughout the length thereof or at intervals. By this method of construction, the mesh-forming bars are tied firmly to the supporting pipe which constitutes the supporting structure.

It is a further object of the invention to provide a novel and valuable combination of parts in this new well screen, which combination includes a pipe having narrow bars placed thereon in spaced arrangement so as to form screen slots therebetween, and the pipe having openings therethrough which are enlarged at their outer ends, these openings lying underneath the narrow bars so that fluid which has entered the narrow screen slots between the mesh-forming bars may have a means of access to the interior of the screen structure.

Further objects and the various advantages of the invention will be made evident hereinafter.

Referring to the drawings which are for illustrative purposes only,

Fig. 1 is an elevational view showing both ends of a screen embodying features of the invention.

Fig. 2 is a fragmentary cross-section on a plane represented by the line 2—2 of Fig. 1.

Fig. 3 is a section on a plane represented by the line 3—3 of Fig. 2, illustrating a characteristic of the reinforcing rib construction forming part of the invention.

Fig. 4 is a fragmentary section similar to Fig. 3, showing another form of reinforcing rib construction.

Fig. 5 is a fragmentary plan view showing the method of removing metal from the mesh-forming bars at points where it is desired to assure or increase the penetration of the weld.

Fig. 6 is a fragmentary plan view similar to Fig. 5 showing the relieving of metal continuously along the path in which it is desired to weld in a reinforcing strip.

Fig. 7 is a fragmentary perspective view showing a preferred method of forming the longitudinal reinforcing ribs by cutting a channel into or through the assembly of mesh-forming bars and filling such channel with electrically deposited metal.

Fig. 8 is an enlarged fragmentary section showing the preferred form of drainage openings employed in the wall of the supporting structure.

Fig. 9 is a somewhat diagrammatic view showing a method pursued in the winding of the mesh-forming bar on the supporting structure.

Fig. 10 is a perspective view showing a clamping device and illustrating the method of clamping the mesh-forming bars on the supporting structure during the forming of the longitudinal reinforcing ribs.

Fig. 11 is a fragmentary elevational view illustrating another method of forming the longitudinal ribs in the screen structure.

Fig. 12 is a cross-sectional view indicating two additional forms of screen construction following the precepts of my invention, wherein longitudinal channels or passages are provided under the mesh-forming bars.

Fig. 13 is a fragmentary perspective view showing a representative form of mesh-forming bar which may be used in the practise of the invention.

In Figs. 1 and 2 of the drawings, 1 shows a pipe with a coupling 14 on one end and a sleeve 14—A on the other end, this pipe forming a supporting structure 15 of tubular form having drainage holes 16 formed therein, these holes being preferably made by a drill or drill and countersink. Externally encasing the supporting structure is a mesh-forming covering 17 consisting of parallel longitudinal ribs or strips 18, placed on the supporting structure in substantially equally spaced circular order, and relatively narrow bars 19 extending circumferentially across the surface of the supporting structure between the longitudinal reinforcing ribs 18, these bars 19 being spaced apart so as to leave narrow screen slots 20 therebetween and extending circumferentially from each longitudinal reinforcing rib 18 to the ribs adjacent thereto. The various conditions encountered in wells require that the mesh or gauge of well screen vary between the limits of .007 of an inch and .125 of an inch, depending on the character of the sands or earth structure found in the well in which the screen is to be used. The screen described herein may be readily constructed to the desired gauge by providing the required spacing of the strips so that the mesh or screen slots formed therebetween will be of the desired width. The feature of making up the outer casing 17 of the screen so as to have the form of narrow bars placed side by side between the longitudinal ribs 18, provides screen slots of large number distributed over substantially the entire exterior of the screen structure.

I have previously described the screen as comprising a tubular supporting structure having an outer casing consisting of longitudinal ribs and circumferential cross bars spaced apart so as to provide screen slots between the narrow bars, but it will be recognized that it may also be described as including a tubular supporting structure or pipe 15 having a tubular shell 17 thereon, with slots 20 distributed in side by side arrangement but with the ends of the slots being aligned in a manner to form elongated areas 18 of uninterrupted metal in the casing 17, which areas are adapted to serve as interconnecting and reinforcing means for the narrow bars 19 formed by the metal wall of the casing 17 existing between the slots 20. Although I have illustrated the bars 19 and slots 20 as of circular extension, they may be placed in other direction of extension, such as longitudinally.

The invention also includes a new and valuable method whereby the screen may be accurately and comparatively easily made. This method is substantially as follows: The perforated pipe 15 forming the supporting structure is caused to rotate on its axis in the direction indicated by the arrow 22 of Fig. 9, and as diagrammatically illustrated in this figure, a single bar 19, or a selected number thereof, are wound spirally on the surface of the pipe 15, the separate and adjacent turns of the bars 15 being spaced apart so as to provide spaces therebetween, these spaces being for the purpose of forming the previously mentioned screen slots 20 in the outer covering or casing 17 of the screen structure. Although it is possible to wind the bars 19 on the pipe cold, I find it expedient where the larger sizes of bar are to be wound, to heat the bar just prior to the winding operation so that the effects of the resiliency of the cold bar may be overcome, and I also find it desirable to heat the bar for the reason that such heating causes the bar to elongate previous to the winding thereof and to contract on the pipe 15 upon cooling, thus causing the turns thereof to constrict on and tightly grip the supporting structure or pipe. This heating may be accomplished by spacing roller electrodes 23 and 24 along the bar 19 previous to the point at which it is to be wound on the pipe 15, and passing electric current through the included portion 21 of the bar by connecting an electric current source 25 to the electrodes 23 and 24 with conductors 26 and 27, one of which may be provided with a suitable switch as indicated at 28.

After the winding of the bar 19 on the perforated pipe 15, the spirals or turns of the winding are traversed with the longitudinal reinforcing ribs or strips 18, each of which members 18 are preferably formed by first cutting a channel across the bars or bar-portions constituting the turns of the winding and then substantially filling the channel with the strip or rib of metal 18. The preferred method of cutting the channel and installing the rib 18, as indicated in Fig. 7, is to advance a metal arc-welding electrode 29 along the perforated pipe 15 in such position that the electric flame or arc will cut into or entirely through the consecutive bar-portions 19 as they are approached in the advance of the electrode 29, with the result that a channel 30 will be cut by the arc, which channel is then filled behind the position of the electrode by fluid metal deposited from the electrode, this fluid metal fusing at 31 with the members 19 and combining with these members in a homogeneous integral metal structure consisting of metal ribs 18 with bars 19 projecting laterally therefrom over the surface of the supporting structure or perforated pipe 15. I have found that it is possible to control the depth to which the ribs 18 may be caused to penetrate into the bars 19, by the use of suitable expedients, and have also developed the following method of securing a metal covering to the surface of another metal object. By adopting a proper proportion between the voltage and operating capacity at which the arc-welding equipment is operated, the size of the bar 19 wound on the supporting structure 15, and the spaces between the bars 19, or turns thereof, it is possible to electrically cut entirely through the bars so that the channel 30 extends down into communication with the surface of the supporting structure, with the result that the strip or rib 18 which is fused into and fills the channel 30 will have a height equivalent to the thickness or height of the bars 19, as shown in Figs. 2 and 7, and it is also possible to cause the weld comprising the rib 18 to fuse into and adhere to the supporting structure throughout the entire length of the weld, as shown at 32 in Fig. 3. A preferable and practical condition of penetration is where the arc or welding flame cuts deep enough into the bars 19 to cause the bottom portions of the bars at the bottoms of the channels 30 to be reduced to fluid condition so as to readily unite with the metal being deposited from the electrode, which deposited metal will then fill in solidly between the bottom portions of the bars 19 at the position of the weld and combine the longitudinal rib 18 and the bars 19 into an integral structure. It is not necessary however that the rib 18 penetrate through the bars 19, but is desirable that the principal portion of the rib lie below the plane represented by the outer surface of the bars. A condition which contributes to good penetration without excessive destruction of metal, is the presence of the spaces between the bars 19 which form exhaust channels 34, Fig. 7, through which may discharge the combustion products or gases formed by the burning up of metal due to the great heat of the electric arc. The combustion gases flow laterally to each side as indicated by the arrows 35 through these exhaust passages 34, and therefore are not thrown back or upward against the electrode, the electrode thus being relieved of a large proportion of the heat which it receives where a weld is being made against a solid or substantially flat surface. The combustion gases in flowing out through the exhaust passages 34 carry the heat toward the bars which are then cut away to form the channel 30, instead of this heat rapidly melting away the electrode and causing the formation of a projecting bead or ridge. By advancing the electrode 29 at a relatively high rate of travel across the bars 19, a rib may be formed which will lie entirely below the surface of the bar structure, but the channel 30 may be entirely filled by slowing down the advance of the electrode 29, thus giving desirable results. Contributing also to the channelling action is the form of the bar 19, which is narrower along its lower portion than along its upper portion, with the sides thereof converging inwardly toward the center of the screen structure, this formation resulting in an increase in the width of the exhaust channels 34 at the lower portions thereof and a decrease in the width of metal at the lower edges of the bars 19 which are to be cut away by the arc. The previously described operations constitute a welding method in which one member which is to be welded to another is equipped with outwardly leading channels or slots through which the combustion products of the welding arc may be carried off without being thrown back against the electrode, thereby contributing to maximum penetration.

In Fig. 4 of the drawings, I show a section through a weld or rib 18 which, though penetrating substantially through the bars 19 to the surface of the supporting structure, does not adhere continuously to the surface of the supporting structure, but is made to fuse with the supporting structure 15 at intervals, as indicated at 36 in the figure. This character of penetration is highly desirable in the construction of the well screen treated herein, for the reason that it is not necessary that the ribs 18 be fused continuously to the supporting structure, and may be accomplished in several different ways, as by controlling the advance of the welding operation, by periodically increasing the voltage at which the arc is operating, by using a welding rod or electrode of higher penetration characteristics at the point where it is desired to fuse the rib 18 to the supporting structure, or, as shown in Fig. 5, by relieving or removing metal from the bars 19 at the point 36 where fusion of the rib 18 to the supporting structure is desired. In this Fig. 5, dotted lines 39 represent the path through which the weld is to be carried. At the point 36 metal is removed from a single bar or several bars 19 by drilling a single hole or several small holes 38 thereinto or therethrough, so that there is but relatively little metal at this point to be cut away by the welding arc or flame, and with the result that the arc is immediately applied directly to the surface of the supporting structure at this point and causes fusion of the metal of the supporting structure so that the rib 18 will adhere thereto at the required place. This last method of causing adherence at intervals is especially suited to use with automatic electric equipment, where the arc remains practically steady and progresses at a substantially constant rate of speed. Fig. 6 shows the entire path 39 through which the weld is to be carried relieved of metal by the drilling of holes 41 through the bars 19, this expedient being adapted for use where the welding equipment is of low capacity such as would not be capable of cutting through bars of full dimension. For instance, welding equipment having capacity to properly channel into or through very narrow bars might not be capable of cutting into large bars to the desired extent, but removing metal from the path of the weld as shown in Fig. 6 makes it possible to employ this low capacity equipment on the large size bars.

In Fig. 8 I show a fragmentary cross-section of a perforated pipe 15 having relieved bars 19 placed thereon, and having in combination therewith a form of drainage opening 16 having the mouths or outer portions thereof enlarged by countersinking as indicated at 43. This structure enables the use of holes of small diameter without possibility of the openings being closed or nearly closed by bars extending directly thereover, and also eliminates the necessity of aligning the openings 16 accurately with the screen slots 20 formed between the bars 19. Also with this form of construction, the gauge of the screen slot and its governing helix or spiral at which the bar 19 is wound, may be varied to suit requirements without the necessity of changing the spacing of the holes 16, for the reason that the enlarged mouths thereof encompass sufficient area to include two or more adjacent screen slots 20.

An important step in the process of making the screen treated herein, is illustrated in Fig. 10 of the drawings wherein I show in perspective a clamping device including a pair of jaws 45, the inner edges of which are parallel and define a longitudinal path therebetween in which the weld or rib 18 is to be extended along the surface of the supporting structure 15 of a screen pipe having a covering or casing 17 of bars 19 wound thereon. In the practise of the clamping operation, the screen structure is received in an anvil or V-block 46, and by proper manipulation of a lever 47, mechanism within the housing 48 is operated in a manner to cause the jaws 45 to be drawn downwardly on to the winding 17 of bars 19, thus holding the bars 19 securely in place on the perforated pipe 15 during the channelling and welding operations. With a mechanism of the general character indicated in Fig. 10, the bars are held tightly against the pipe during the application of the weld which weld, on cooling, contracts so as to constrict the bars tightly against the pipe which in this figure represents a supporting structure for the outer slotted casing of the well screen.

Although my preferred method of construction contemplates the previously described operations which include winding of the mesh-forming bars 19 on the supporting structure 15 and then cutting the longitudinal reinforcing ribs thereinto, it is possible, and may be found desirable to place the bars 19 on a perforated pipe 15 in the form of separate bar segments as shown in Fig. 11, having the ends 50 thereof aligned so as to form a channel 30 between the ends of the segments in which the rib 18 may be formed by filling the channel with a weld, or by placing a longitudinal bar 51 in the channel 30 and welding between the ends of the segmental bar-portions 19 and the side of the bar 51 as indicated at 52, and thereby in the above manner providing a perforate supporting structure having ribs exterior thereof, between which relatively narrow bars are extended in side by side arrangement with screen slots left between the bars, and with the ribs and bars likewise being incorporated in an integral outer casing.

Fig. 12 shows two methods of providing a screen having an inner tubular structure equipped with drainage openings and an outer slotted or perforated casing, and having longitudinal passages formed between the inner tubular member and the outer casing through which fluid on having entered the slots in the casing may circulate to find entry to the interior of the inner tubular member. The upper half of the supporting structure or perforated pipe 15, shown in this Fig. 12 has projecting ridges 55 longitudinally placed between the positions of the reinforcing ribs 18. The bars 19 when placed or wound on the pipe 15, are held away from the surface of the pipe 15 by the ridges 55 so that longitudinal spaces 56 are formed between the outer surface of the supporting structure or pipe and the perforated casing 17, these spaces 56 having communication with the drainage openings 16 in the pipe 15. The lower half of Fig. 12 shows the pipe 15 as having longitudinal channels 58 cut in the outer surface thereof, with the result that longitudinal passages are thus formed between the supporting structure or pipe 15 and the outer casing 17 constructed of the bars 19 placed or wound thereon. Although I have previously described the invention in its most simple form in which single narrow bars are employed in making the outer perforated casing 17, these bars may be made in the form of flat strips, if desired, and such flat strips, as shown at 60 in Fig. 13, may be provided with slots 61, and the edges 62 thereof may be converged downwardly or inwardly so that inwardly expanding slots may be formed between the edges of adjacent strips 60 when they are placed on the tubular supporting structure.

I claim as my invention:

1. In a well screen: a tubular perforate supporting structure; narrow bars placed side to side on said supporting structure and spaced apart to form intervening screen slots; and securing strips traversing said bars, said strips including metal fused with said bars and having the inner portions thereof projecting below the plane of the outer surface of said bars in a manner to form a homogeneous metal slotted casing on said supporting structure.

2. In a well screen: a tubular perforate supporting structure: narrow bars placed side to side on said supporting structure and spaced apart to form intervening screen slots; and reinforcing strips traversing said bars, said strips including metal fused into said bars and lying principally below the plane of the surface thereof so as to form a homogeneous slotted casing on said supporting structure.

3. In a well screen: a perforate tubular supporting structure: narrow bars placed side by side on said supporting structure and spaced apart to form intervening screen slots; and reinforcing strips traversing said bars, said strips including metal fused into said bars and penetrating through said bars to the plane of the surface of said supporting structure.

4. In a well screen: a perforate tubular supporting structure; narrow bars placed side by side on said supporting structure and spaced apart to form intervening screen slots; and reinforcing strips traversing said bars, said strips including metal fused into and through said bars to the surface of said supporting structure, and being fused to said supporting structure.

5. In a well screen: a perforate tubular supporting structure; narrow bars wound spirally on said supporting structure with screen slots between the turns thereof; and longitudinally extending reinforcing strips channeled across and into said bars, said strips consisting of metal fused into and below the surface of said bars and extending progressively from bar to bar, so as to form in conjunction with said bars a slotted casing on said supporting structure consisting of longitudinal strips having narrow bar-portions extending therebetween.

6. In a well screen; as defined in claim 5, in which said reinforcing strips include portions which penetrate through to the bottoms of said bars, thus dividing the bars into sections.

7. A well screen as defined in claim 5, in which said reinforcing strips include portions which penetrate through to the bottoms of said bars and are suitably fused to said supporting structure.

8. A method of making well screen, including winding bars on a supporting structure with spaces between the edges of separate turns; and cutting a weld across said bars whereby to form a longitudinal reinforcing strip traversing said bars and being fused therewith so as to form a homogeneous metal structure.

9. A method of making well screen, including winding bars on a supporting structure with spaces between the edges of separate turns; clamping the bars against movement on either side of a longitudinal path; and welding a strip of metal along said path whereby to form a longitudinal reinforcement traversing said bars and being fused therewith so as to form a homogeneous metal structure.

10. A method of making well screen, including: winding bars on a supporting structure with spaces between the edges of separate turns; and cutting a weld across and through said bars whereby to form a longitudinal reinforcing strip traversing said bars and being fused therewith so as to form a homogeneous metal structure.

11. A method of making well screen, including; winding bars on a supporting structure with spaces between the edges of separate turns; clamping said bars along a longitudinal path; and cutting a weld across and through said bars along said path, whereby to form a longitudinal reinforcing strip traversing said bars and being fused therewith so as to form an integral homogeneous metal structure.

12. A method of making well screen, including; placing bars on a supporting structure with spaces between the edges thereof; cutting a channel across said bars; and fusing a reinforcing strip across said bars and through said channel.

13. A method of making well screen including: placing bars on a supporting structure with spaces between the edges thereof; holding said bars against movement along a transverse path; cutting a channel across said bars and along said path; and fusing a reinforcing strip in said channel, such reinforcing strip extending from bar to bar and being fused therewith to form a homogeneous metal structure.

14. A method of making well screen, including: winding bars on a supporting pipe with spaces between the turns thereof to form screen slots; and forming metal strips traversing said bars by progressively applying melted metal along the path of said metal strips and fusing such metal with said bars as the building up of said metal strips progresses from bar to bar.

15. A method of making well screen, including: winding bars on a supporting pipe with spaces between the turns thereof to form screen slots; and forming metal strips traversing said bars by progressively bringing the portions of said bars in the path of said metal strips to a molten condition whereby said portions of said bars flow and fuse together.

16. A method as defined in claim 15, further including the addition of melted metal from an external source as said metal strips progress to bring the surfaces of said metal strips to the required height.

17. In a well screen: a tubular perforated supporting member; bars wound thereon in spaced arrangement so as to provide screen slots between the turns thereof; and metal strips traversing said bars, the inner edges of said strips lying below the normal outer surface of said bars and being fused with said bars at the point of crossing.

18. In a well screen: a tubular perforated supporting member; bars wound thereon in spaced arrangement so as to provide screen slots between the turns thereof; and metal strips traversing said bars, the inner portions of said strips being channeled into said bars so as to lie below the outer level of said bars.

Signed at Los Angeles, county of Los Angeles and State of California, this twenty-third day of September, 1927.

JESSE P. WHANN.